United States Patent [19]

Seide

[11] Patent Number: 5,857,169
[45] Date of Patent: Jan. 5, 1999

[54] METHOD AND SYSTEM FOR PATTERN RECOGNITION BASED ON TREE ORGANIZED PROBABILITY DENSITIES

[75] Inventor: Frank Seide, Aachen, Germany

[73] Assignee: U.S. Philips Corporation, New York, N.Y.

[21] Appl. No.: 704,199

[22] Filed: Aug. 28, 1996

[30] Foreign Application Priority Data

Aug. 29, 1995 [EP] European Pat. Off. .............. 95202318

[51] Int. Cl.$^6$ ..................................................... G10L 5/04
[52] U.S. Cl. .......................................... 704/256; 704/221
[58] Field of Search .................................... 704/255, 256, 704/231, 251, 243

[56] References Cited

U.S. PATENT DOCUMENTS 5,528,701   6/1996   Aref ........................................ 382/178

FOREIGN PATENT DOCUMENTS

0627726A1   12/1994   European Pat. Off. .

OTHER PUBLICATIONS

L. Rabiner "A Tutorial on Hidden Markov Models and Selected Applications in Speech Recognition", Proceeding of the IEEE, vol. 77, Feb. 1989.

L. Rabiner, "Fundamentals of Speech Recognition", Prentice Hall, Section 3.4.4, p. 125.

Fissore, Luciano et al. Lexical Access to Large Vocabularies for Speech Recognition. IEEE Transactions on Acoustics, Speech, and Signal Processing. vol. 37, No. 8, Aug. 89. 1197–1213.

Foote, J.T. Discrete MMI probability models for HMM Speech Recognition. ICASSP '95: Acoustics, Speech and Signal Processing. May 9. 461–464.

Rabiner, L.R. HMM Clustering for Connected Word Recogntion. ICASSP '89: Acoustics, Spech and Signal Processing. Feb. 89. 405–408.

Watanabe, Takao. High Speed Speech Recognition Using Tree–Structured Proability Density Function. ICASSP '95: Acoustics, Speech and Signal Processing. May 95. 556–559.

*Primary Examiner*—David D. Knepper
*Assistant Examiner*—M. David Sofocleous

[57] ABSTRACT

A time-sequential input pattern (20), which is derived from a continual physical quantity, such as speech is recognized. The system includes input means (30), which accesses the physical quantity and therefrom generates a sequence of input observation vectors. The input observation vectors represent the input pattern. A reference pattern database (40) is used for storing reference patterns, which consist of a sequence of reference units. Each reference unit is represented by associated reference probability densities. A tree builder (60) represents for each reference unit the set of associated reference probability densities as a tree structure. Each leaf node of the tree corresponds to a reference probability density. Each non-leaf node corresponds to a cluster probability density, which is derived from all reference probability densities corresponding to leaf nodes in branches below the non-leaf node. A localizer (50) is used for locating among the reference patterns stored in the reference pattern database (40) a recognised reference pattern, which corresponds to the input pattern. The locating includes, for each input observation vector, searching each tree structure for reference probability densities which give a high likelihood for the observation vector. Each tree is searched by selecting at the level immediately below the root node a number of nodes for which the corresponding cluster probability densities give an optimum cluster likelihood. This is repeated at successively lower levels of the tree by using each selected node as a root node, until the selected node is a leaf node. For each selected leaf node, the corresponding reference probability density is used to calculate the likelihood of the input observation vector. These likelihoods are combined per reference pattern to give a pattern similarity score. The recognised pattern is one of the reference patterns for which an optimum of the pattern similarity scores is calculated. Output means (70) are used for outputting the recognised pattern.

10 Claims, 3 Drawing Sheets

METHOD AND SYSTEM FOR PATTERN RECOGNITION BASED ON TREE ORGANIZED PROBABILITY DENSITIES

BACKGROUND OF THE INVENTION

1. Field of the Invention

The invention relates to a method for recognizing an input pattern which is derived from a continual physical quantity. The invention also relates to a system for recognizing a time-sequential input pattern, which is derived from a continual physical quantity.

2. Description of the Related Art

Figure 1:
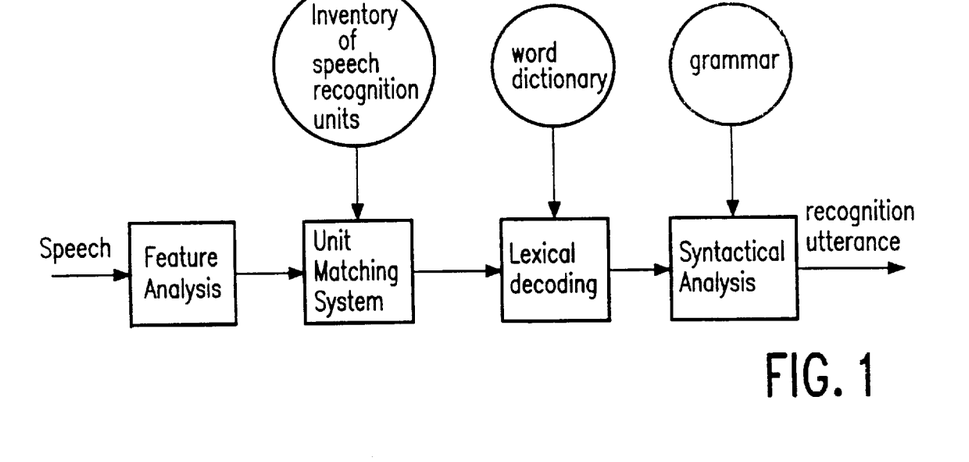
FIG. 1 illustrates the processing steps which are commonly used for continuous speech recognition.

Recognition of a time-sequential input pattern, which is derived from a continual physical quantity, such as speech or images, is increasingly getting important. Particularly, speech recognition has recently been widely applied to areas such as telephone and telecommunications (various automated services), office and business systems (data entry), manufacturing (hands-free monitoring of manufacturing processes), medical (annotating of reports), games (voice input), voice-control of car functions and voice-control used by disabled people. For continuous speech recognition, the following signal processing steps are commonly used, as illustrated in FIG. 1 [refer L. Rabiner "A Tutorial on Hidden Markov Models and Selected Applications in Speech Recognition", Proceeding of the IEEE, Vol. 77, No. 2, February 1989]:

Feature analysis: the speech input signal is spectrally and/or temporally analyzed to calculate a representative vector of features (observation vector $\bar{o}$). Typically, the speech signal is digitized (e.g., sampled at a rate of 6.67 kHz.) and pre-processed, for instance, by applying pre-emphasis. Consecutive samples are grouped (blocked) into frames, corresponding to, for instance, 32 msec. of speech signal. Successive frames partially overlap, for instance, 16 msec. Often the Linear Predictive Coding (L.C.) spectral analysis method is used to calculate for each frame a representative vector of features (observation vector $\bar{o}$). The feature vector may, for instance, have 24, 32 or 63 components (the feature space dimension).

Unit matching system: the observation vectors are matched against an inventory of speech recognition units. Various forms of speech recognition units may be used. Some systems use linguistically based sub-word units, such as phones, diphones or syllables, as well as derivative units, such as fenenes and fenones. Other systems use a whole word or a group of words as a unit. The so-called hidden Markov model (HMM) is widely used to stochastically model speech signals. Using this model, each unit is typically characterized by an HMM, whose parameters are estimated from a training set of speech data. For large vocabulary speech recognition systems involving, for instance, 10,000 to 60,000 words, using a limited set of, for instance 40, sub-word units is used, since it would require a lot of training data to adequately train an HMM for larger units. The unit matching system matches the observation vectors against all sequences of speech recognition units and provides the likelihoods of a match between the vector and a sequence. Constraints can be placed on the matching, for instance by:

Lexical decoding: if sub-word units are used, a pronunciation lexicon describes how words are constructed of sub-word units. The possible sequence of sub-word units, investigated by the unit matching system, is then constrained to sequences in the lexicon.

Syntactical analysis: further constraints are placed on the unit matching system so that the paths investigated are those corresponding to speech units which comprise words (lexical decoding) and for which the words are in a proper sequence as specified by a word grammar.

Figure 2:
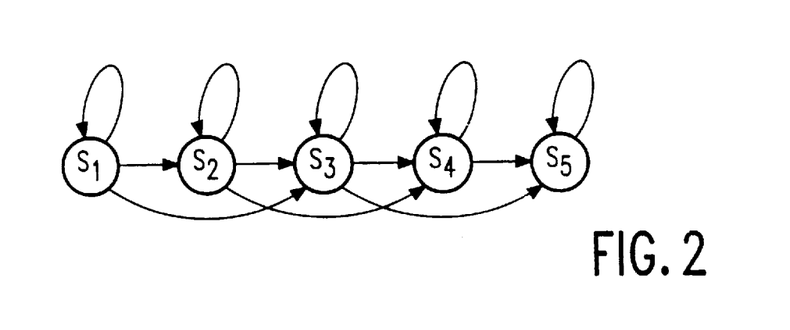
FIG. 2 shows an example of a left-right discrete Markov process.

A discrete Markov process describes a system which at any time is in one of a set on N distinct states. At regular times, the system changes state according to a set of probabilities associated with the state. A special form of a discrete Markov process is shown in FIG. 2. In this so-called left-right model, the states proceed from left to right (or stay the same). This model is widely used for modeling speech, where the properties of the signal change over time. The model states can be seen as representing sounds. The number of states in a model for a sub-word unit could, for instance, be five or six., in which case, in average, a state corresponds to an observation interval. The model of FIG. 2 allows a state to stay the same, which can be associated with slow speaking. Alternatively, a state can be skipped, which can be associated with speaking fast (in FIG. 2, up to twice the average rate). The output of the discrete Markov process is the set of states at each instance of time, where each state corresponds to an observable event. For speech recognition system, the concept of discrete Markov processes is extended to the case where an observation is a probabilistic function of the state. This results in a double stochastic process. The underlying stochastic process of state changes is hidden (the hidden Markov model, HMM) and can only be observed through a stochastic process that produces the sequence of observations.

For speech, the observations represent continuous signals. The observations can be quantized to discrete symbols chosen from a finite alphabet of, for instance, 32 to 256 vectors. In such a case, a discrete probability density can be used for each state of the model. In order to avoid degradation associated with quantizing, many speech recognition systems use continuous mixture densities. Generally, the densities are derived from log-concave or elliptically symmetric densities, such as Gaussian (normal distribution) or Laplacian densities. During training, the training data (training observation sequences) is segmented into states using an initial model. This gives for each state a set of observations, referred to as training observation vectors or reference vectors. Next, the reference vectors for each state are clustered. Depending on the complexity of the system and the amount of training data, there may, for instance, be between 32 to 120 elementary clusters for each state. Each elementary cluster has its own probability density, referred to as reference probability density. The resulting mixture density for the state is then a weighted sum of the reference probability densities for a state.

To recognize a single speech recognition unit (e.g., word or sub-word unit) from a speech signal (observation sequence), for each speech recognition unit the likelihood is calculated that it produced the observation sequence. The speech recognition unit with maximum likelihood is selected. To recognize larger sequences of observations, a leveled approach is used. Starting at the first level, likelihoods are calculated as before. Whenever the last state of a model is reached, a switch is made to a higher level, repeating the same process for the remaining observations. When the last observation has been processed, the path with the maximum likelihood is selected and the path is back-tracked to determine the sequence of involved speech recognition units.

The likelihood calculation involves calculating in each state the likelihood of the observation (feature vector) for each reference probability density for that state. Particularly, in large vocabulary speech recognition systems using continuous observation density HMMs, with, for instance, 40 sub-word units, 5 states per sub-word unit and 64 clusters per state this implies 12800 likelihood calculations for, for instance, 32 dimensional vectors. These calculations are repeated for each observation. Consequently, the likelihood calculation may consume 50%–75% of the computing resources.

It is known from EP-A-627-726 to reduce the percentage of time required for the likelihood calculation by organizing the reference probability densities, using a tree structure, and performing a tree search. At the lowest level of the tree (level 1), each of the leaf nodes corresponds to an actual reference probability density. As described earlier, a reference probability density represents an elementary cluster of reference vectors. At level two of the tree, each non-leaf node corresponds to a cluster probability density, which is derived from all reference probability densities corresponding to leaf nodes in branches below the non-leaf node. As such, a level two non-leaf node represents a cluster of a cluster of reference vectors. This hierarchical clustering is repeated for successively higher levels, until at the highest level of the tree, one non-leaf node (the root node) represents all reference vectors. During the pattern recognition, for each input observation vector, a tree search is performed starting at one level below the root. For each node at this level, the corresponding cluster probability density is used to calculate the likelihood of the observation vector. One or more nodes with maximum likelihood are selected. For these nodes, the same process is repeated one level lower. In this manner, finally a number of leaf nodes are selected for which the corresponding reference probability density is used to calculate the likelihood of the observation vector. For each leaf node which is not selected, the likelihood is approximated by the likelihood of its mother node, which was last selected.

SUMMARY OF THE INVENTION

It is an object of the invention to provide an improved method and system of the kind set forth above.

This and other object according to the present invention are provided by a method which employs a separate tree structure to represent reference probability densities associated with each reference unit. More specifically, the method permits selecting leaf nodes of each separate tree structure by searching each separate tree structure.

Thus, instead of organizing all reference vectors into one tree, separate trees are built for each reference unit. For example, if there are N1 reference patterns (e.g., HMM's), each having N2 reference units (states), N1 *N2 trees can be built and searched for each observation vector. If in the known system a relatively small subset of reference probability densities is selected, the corresponding set of elementary clusters will be dominated by reference vectors (sounds) which are 'near' the observation vector. The inventors have established that in this way, there typically is a large group of reference vectors, which are not near enough to be selected but are not far enough away to have no significant contribution to the likelihood calculation. This means that, although for this one observation vector a reference vector of this group is not a very good match, the reference pattern, which the reference vector represents, may very well be a good match for the entire sequence of observation vectors. It is, therefore, important to be able to distinguish between reference vectors of this group. In the known system, for all reference vectors in this group, the likelihood is approximated by the likelihood of the lowest branch of which they are a member and for which the likelihood has been calculated. This implies that similar sounds, represented by reference vectors in the same non-selected branch, cannot be discriminated, resulting in degradation in recognition.

In contrast, the inventors have concluded that further discrimination is required for more accurate recognition. This is achieved by using a plurality of trees. For the recognition of the entire pattern, for each observation vector the likelihood of the observation matching an HMM state needs to be calculated (and the entire likelihood needs to be accumulated). This implies that for each state at least one reference probability density needs to be involved (preferably the one giving the highest likelihood for that state). To achieve this in the known system, the selected set needs to be relatively large. According to the invention, separate trees are used for each state, ensuring that each state is involved with at least one representative reference probability density. As a consequence, the set of selected leaves, which is required for accurate recognition, can be significantly reduced. This advantageously reduces the processing time required for the maximum likelihood calculation.

These and other objects, features and advantages according to the present invention are provided by a method which includes a step of searching the tree structure via non-leaf nodes. Preferably, this searching step includes substep for searching at least one level of the tree structure over a path via one non-leaf node for which an optimum of the cluster likelihood is calculated, and paths via non-leaf nodes for which the cluster likelihood is within a predetermined range of the optimum cluster likelihood. A range, e.g., a threshold is used to determine whether to select, at each level of the tree, one or more subsets. Advantageously, at each level of the tree, the subset with the highest likelihood, i.e., the 'nearest' to the observation vector, is determined. If another subset has a likelihood which is similar to the highest likelihood, i.e., the difference of the highest likelihood and the likelihood of the other subset is below a threshold, then also the other subset is computed further. In this way, the number of reference probability densities, which are finally selected at level one of the tree, can be dynamically determined.

This has the advantage that when not many reference probability densities for a certain observation vector give a relatively high likelihood, it is likely that the subset will be small. Thus, when there are only a few good candidates for matching the observation vector, then the recognition generally will be fast. However, when many reference probability densities for a certain observation vector give a similar, relatively high likelihood, it is likely that the subset will be large. Thus, when there are many good candidates for matching the observation vector, then the recognition generally will be more discriminative, resulting in high accuracy.

According to one aspect of the present invention, the tree structure is a quaternary tree, in which each non-leaf node is hierarchically one level above a maximum of four nodes and at least one non-leaf node is hierarchically one level above four nodes. In principle, the accuracy of recognition improves if a tree structure is used with many branches at each non-leaf node of the tree. In this case, the division into clusters is more accurate and the chance that the correct cluster will be selected is higher. The number of calculations, however, increases if the number of branches increases, reducing the recognition performance. The inventors have established that, for a typical large vocabulary speech recognition system, a quaternary tree strikes a good balance between accuracy and performance.

These and other objects, features and advantages according to the present invention are provided by a recognition method characterized by a step of searching a tree structure via the non-leaf nodes. Preferably, this searching step is applied to a group of non-leaf nodes within a same branch of the tree structure and at a same level of the tree structure. According to one aspect of the present invention, the searching step includes steps for: calculating, for a selected pair of the non-leaf nodes, a cluster comparison score between the two corresponding cluster probability densities and the input observation vector $\bar{o}$; repeatedly calculating the cluster comparison score for the non-leaf node, for which the previously calculated cluster comparison score indicated the highest likelihood, and another non-leaf node of the group for which no cluster comparison score has been calculated yet, until a cluster comparison score has been calculated for all non-leaf nodes of the group; and including in the searching a path via the non-leaf node for which the cluster comparison score indicated the highest likelihood. It will be noted that the cluster comparison score indicates which of the two corresponding cluster probability densities gives the highest likelihood for the input observation vector $\bar{o}$.

According to another aspect of the present invention, the cluster likelihood, which is calculated for each non-leaf node, is only used to select at the lowest level of the tree a number of leaf nodes. For these leaf nodes, the corresponding reference probability densities are used for the pattern recognition. This makes it possible to, instead of fully calculating the cluster likelihood, calculate the difference in likelihood between pairs of clusters. Since, for certain densities, the comparison calculation is simpler than the full likelihood calculation, this makes it possible to determine quicker which cluster is most likely.

These and other objects, features and advantages according to the present invention are provided by a recognition method employing probability densities wherein the probability densities are derived from a sequence of training observation vectors, representing known input patterns, and wherein the representing the set of reference probability densities as a tree structure. Preferably, the method includes steps for clustering the training observation vectors into a hierarchical set of clusters, and calculating, for each cluster, a cluster probability density. Moreover, the representation of the set of reference probability densities as a tree structure advantageously can be accomplished by steps including: segmenting the sequence of training observation vectors into a sequence of corresponding reference patterns and corresponding reference units; and iteratively clustering, for each reference unit, the corresponding training observation vectors into a hierarchical set of clusters, forming separate tree structures, each of which corresponds to a separate reference unit; and time aligning the sequence of training observation vectors according to the sequence of reference units. This time alignment is preferably accomplished using steps for: determining a corresponding reference unit, which according to a predetermined optimality criterion is most likely, for each training observation vector; and assigning each training observation vector to one of the clusters by searching the tree structure of the corresponding reference unit for the cluster with an optimum cluster likelihood.

During the training phase, clustering is performed, resulting in estimating the density parameters, as well as assigning the training observation vectors to reference units. As mentioned above, these operations are performed in an iterative manner. According to one aspect of the invention, a separate tree structure is built in this way for each reference unit. The inventors have established that by integrating the tree building into the iterative procedure, the accuracy of pattern recognition is improved. Furthermore, since training observation vectors are reassigned to reference units during the iteration and, consequently, need to be reassigned to the appropriate cluster, it has been found that the time required for training the system significantly reduced by using the partly built tree for determining the most appropriate cluster.

These and other objects, features and advantages according to the present invention are provided by a recognition system, which includes a tree building device which represents an associated reference probability densities as a separate tree structure for each reference unit; a reference pattern database which stores the separate tree structure for each reference unit; and locating circuitry which selects leaf nodes of each separate tree structure by performing a search for each separate tree structure.

These and other objects, features and advantages according to the present invention are provided by a recognition method for recognizing an input pattern which is derived from a continual physical quantity. Preferably, the recognition method includes steps for: accessing the physical quantity and generating a sequence of input observation vectors representing the input pattern therefrom; locating a recognized reference pattern, which corresponds to the input pattern from among a plurality of reference patterns; representing a selection of the reference probability densities as a tree structure; and a locating sequence for each input observation vector $\bar{o}$. Preferably, the locating sequence includes steps for selecting a plurality of leaf nodes by searching the tree structure via non-leaf nodes for which the corresponding cluster probability density gives an optimum cluster likelihood for the input observation vector $\bar{o}$; and calculating an observation likelihood of the input observation vector $\bar{o}$ for each reference probability density which corresponds to a selected leaf node.

According to one aspect of the inventive method, each reference pattern is a sequence of reference units and each reference unit is represented by at least one associated reference probability density in a set of reference probability densities. According to another aspect of the invention, each leaf node of the tree structure corresponds to a reference probability density, and where each non-leaf node corresponds to a cluster probability density which is derived from reference probability densities corresponding to leaf nodes in branches of the non-leaf node.

These and other object, features and advantages according to the present invention are provided by a recognition system which recognizes a time-sequential input pattern, which is derived from a continual physical quantity, from an input signal. Preferably, the system includes: an input device which recurrently accesses the physical quantity and generates a time sequence of input observation vectors representing the input pattern therefrom; a tree builder for representing a set of reference probability densities as a tree structure; a reference pattern database for storing a plurality of reference patterns; a localizer circuit for locating among the reference patterns stored in the reference pattern database a recognized pattern, which corresponds to the input pattern; and an output device for outputting the recognized pattern.

In an exemplary case, the locating circuit is responsive to each input observation vector $\bar{o}$ and includes a first device which searches the tree structure stored in the reference pattern database by selecting at the level immediately below the root node a number of nodes for which the corresponding cluster probability density gives an optimum cluster likelihood for the input observation vector $\bar{o}$, and by repeating the selecting of nodes at successively lower levels of the tree by using each selected node as a root node, until the selected node is a leaf node; a second device which calculates an observation likelihood of the input observation vector $\bar{o}$ for each reference probability density which corresponds to a selected leaf node; a third device which calculates, for each reference pattern, a pattern similarity score by combining the observation likelihoods which have been calculated for all reference probability densities representing a reference unit of the reference pattern; and a fourth device which locates the recognized pattern as one of the reference patterns for which an optimum of the pattern similarity scores is calculated.

According to one aspect of the inventive system, the tree builder represents a set of reference probability densities as a tree structure with at least L=3 hierarchical levels, where each leaf node, at level one of the tree, corresponds to a reference probability density, and where each non-leaf node corresponds to a cluster probability density, which is derived from all reference probability densities corresponding to leaf nodes in branches below the non-leaf node. Moreover, each stored reference patterns preferably is a sequence of reference units, wherein each reference unit is represented by at least one associated reference probability density in the set of reference probability densities, with at least one reference unit being represented by at least three associated reference probability densities, and wherein the set of reference probability densities being stored as the tree structure.

BRIEF DESCRIPTION OF THE DRAWING

These and other aspects of the invention will be apparent from and elucidated with reference to the drawings.

DESCRIPTION OF THE PREFERRED EMBODIMENT

Figure 3:
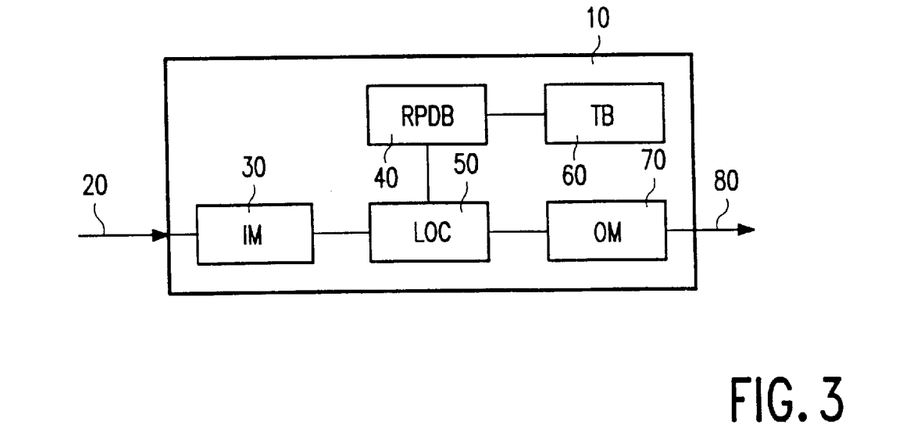
FIG. 3 shows a block-diagram of an embodiment of a system according to the present invention.

FIG. 3 shows a block diagram of a system 10 according to the invention, for recognizing a time-sequential input pattern 20 which is derived from a continual physical quantity, such as speech or images. Input means 30 recurrently accesses the physical quality. For speech, this usually involves sampling the physical quantity at regular intervals, such as 6.67 kHz. and digitizing the sample. The input means 30 processes a group of consecutive samples, corresponding to, for instance, 32 msec. of speech signal, to provide a representative vector of features (the input observation vector $\bar{o}$). In this way, a time sequence of input observation vectors is generated, which represents the input pattern. Typically, the input means 30 may be implemented using a microphone, an A/D converter and a processor, such as a Digital Signal Processor (DSP). Optionally, the input means 30 may comprise a speech detector for effecting the sampling only when speech is effectively received. As an alternative to sampling and digitizing the input signal, the signal may have been stored in memory in a digitized form or may be supplied digitally via a communication network. A reference pattern database 40 is used for storing reference patterns. The reference database 40 may be stored in memory, such as a hard disk, ROM or RAM as an integrated database or, alternatively, as separate data files. As described earlier, speech recognition units are used as reference patterns for recognizing speech. Each reference pattern comprises a sequence of reference units. Each reference unit is represented by at least one associated reference probability density. Using pattern recognition based on Hidden Markov Models, each reference pattern is modeled by a Hidden Markov Model, where the states of the model correspond to a reference unit. Using continuous observation densities, the reference probability densities are usually Gaussian or Laplacian densities. It should be noted that it is known to use a one-state Hidden Markov Model for modeling special patterns which do not have a clear time-sequential behavior, such as the pattern for the silence occurring before or in between words. For the purpose of this invention, such patterns are not described separately. It will be obvious to persons skilled in the art how to integrate such patterns in the system according to the invention.

The system 10 further comprises a tree builder 60, which organizes the reference probability densities, which correspond to a reference unit, into a tree structure. This is repeated for each reference unit. The tree structures are stored in the reference pattern database 40. Each leaf node of the tree structure corresponds to a reference probability density. Details of the tree structure and the building of the structure are described later. The tree builder may be implemented using a DSP or micro-processor. Advantageously, the tree is built in advance during the training of the system.

The system 10 further comprises a localizer 50 for locating in the reference pattern database 40 a reference pattern which corresponds to the input pattern. The localizer 50 may be implemented using a DSP or micro-processor. The located reference pattern is referred to as the recognized reference pattern. The localizer 50 performs the locating by, for each observation vector, searching the tree structure corresponding to a reference unit until at the lowest tree level a number of leaf nodes are selected. For the selected leaf nodes, the localizer 50 determines how well the observation vector matches this reference unit. This involves for each selected leaf node using the reference probability density, which corresponds to the leaf node, to calculate an observation likelihood for the observation vector. For each reference unit, the observation likelihoods, which have been calculated for one observation vector, are combined to give a reference unit similarity score. For each reference pattern, the reference unit similarity scores of the reference unit, which correspond to the reference pattern are combined to form a pattern similarity score. This is repeated for successive observation vectors. The reference pattern for which an optimum, such as a maximum likelihood, is calculated for the pattern similarity score is located as the recognized pattern. The description focuses on locating reference probability densities and calculating observation likelihoods. It is well understood in the art how this key element can be used in combination with other techniques, such as Hidden Markov Models, to recognize a time sequential pattern, which is derived from a continual physical quantity. It is also well understood in the art how techniques, such as a leveled approach, can be used to recognize patterns which comprise a larger sequence of observation vectors than the reference patterns. For instance, it is known how to use sub-word units as reference patterns to recognize entire words or sentences. It is also well understood how additional constraints, such as a pronunciation lexicon and grammar, may be placed on the pattern recognition. The additional information, such as the pronunciation lexicon, can be stored using the same memory as used for storing the reference pattern database.

Output means 70 are used for outputting the recognized pattern. This may take various forms, such as displaying the recognized pattern on screen in a textual format, storing the recognized pattern in memory or using the recognized pattern as input, such as a command, for a next processing operation.

Using Hidden Markov Models, for each Hidden Markov Model and each state s of the model, the likelihood of an observation vector $\bar{o}$ is given by:

$$p(\bar{o}) = \sum_{k=1}^{N} w_k \cdot p(\bar{o}|k)$$

where $w_k$ is the weight of the k-th observation mixture density (cluster) and N is the number of clusters for a state. For simplicity, the state index s is not shown in the formula. Speech recognition systems usually use Laplacian or Gaussian probability densities to model the probability distribution of a cluster. Using the $L_2$-norm, defined as:

$$d_r(\bar{x}, \bar{y}) = \|\bar{x} - \bar{y}\|_r = \left( \sum_{i=1}^{D} |x_i - y_i|^r \right)^{\frac{1}{r}}$$

where the $L_1$-norm is used for Laplacian densities and the $L_2$-norm is used for Gaussian densities, gives as one of the possible formulas for the probability:

$$p(\bar{o}) = \sum_{k=1}^{n} w_k \cdot a \cdot e^{-b\|\bar{o} - \bar{\mu}_k\|_r^r}$$

where the reference vector $\bar{\mu}_k$ is the mean vector of the k-th observation mixture density. The coefficients a and b ensure that the probability integrates up to 1 if the observation vector $\bar{o}$ is run over all possible values. It will be appreciated that also other distance measures than the $L_r$-norm may be used. Various forms or extensions to above formula are well known. As an example, the following three types of multi-variate Gaussian densities are given:

Full covariance matrix $K_{s,k}$: $p(\bar{o}|k) =$ $$\frac{1}{\sqrt{(2\pi)^D det K_{s,k}}} \cdot e^{-\frac{1}{2}(\bar{o}-\bar{\mu}_{s,k})^T K_{s,k}^{-1}(\bar{o}-\bar{\mu}_{s,k})}$$

Diagonal covariance matrix $(K_{s,k})_{dd} =$ $$\sigma_d^2 : p(\bar{o}|k) = \frac{1}{\sqrt{(2\pi)^D \prod_{k=1}^{D} \sigma_k^2}} \cdot e^{-\frac{1}{2} \sum_{k=1}^{D}(o - \mu_k)^2/\sigma_k^2}$$

Scalar variance matrix $K_{s,k} =$ $$I \cdot \sigma_{s,k}^2 : p(\bar{o}|k) = \frac{1}{\sqrt{(2\pi)^D (\sigma_k^2)^D}} \cdot e^{-\frac{1}{2\sigma_k^2}\|\bar{o} - \bar{\mu}_k\|_2^2}$$

In this formula, s is an index to the Hidden Markov Model state and k an index to the density (reference vector) within the state.

Scaling can be used to prevent that terms fall below the precision range of the processor and to normalize the vectors according to the variance of the density. Advantageously, if diagonal covariance matrices are used that are tied (such as a state dependent covariance matrix $K_{s,k} = K_s$, or a grand covariance matrix $K_{s,k} = K$), the observation vector $\bar{o}$ and the mean vectors $\bar{\mu}_k$ are scaled before the likelihood calculation takes place. Scaling is well-known in the art. Advantageously, the reference vectors are scaled in advance and the observation vector is only scaled once before starting the actual likelihood calculations.

Due to the nature of the densities, the sum of probabilities can be approximated by the maximum, i.e. the density which contributes the largest probability. This implies that a key step in locating a reference pattern which corresponds to the input pattern is finding the reference vector which is 'nearest' the observation vector (nearest neighbor search), where 'distance' is defined as the negative logarithm of the likelihood:

$$p(\bar{o}) \approx max\{w_k \cdot a \cdot e^{-b\|\bar{o} - \bar{\mu}_k\|^r} | k=1, \ldots, N\}$$

By taking the negative logarithm, this gives:

$$-\log(p(\bar{o})) \approx min\{b\|\bar{o} - \bar{\mu}_k\|^r - \log(w_k) - \log(a)|k=1, \ldots, N\}$$

For multi-variate Gaussian densities this gives:

$$-\log(p(\bar{o})) \approx min \left\{ \log\frac{1}{w_k} + \frac{D}{2} \log 2\pi + \frac{1}{2} \log det K_{s,k} + \frac{1}{2} (\bar{o} - \bar{\mu}_{s,k})^T K_{s,k}^{-1}(\bar{o} - \bar{\mu}_{s,k}) | k = 1, \ldots, N \right\} \quad (a)$$

Tree structure

Using, for instance, 50 sub-word units, 5 states per sub-word unit and 64 elementary clusters (each represented by an associated reference probability density) per state implies 12800 likelihood calculations involving, for instance, 32 dimensional vectors. These calculations are repeated for each observation. Instead of calculating all likelihoods in full, a tree structure is used to select a subset of reference probability densities for which the likelihood is calculated in full. A tree structure is built for each state. In the example, this would imply 200 (40*5) trees, each comprising 64 reference probability densities which form the mixture density for the state. The N elementary clusters and the associated reference probability densities (with for instance N being 32, 64, 128 or 256) divide the feature vector space into N cells (actually there may be more than N cells if the variances of the densities vary a lot. The formulae implicitly handle this). As will be explained later in more detail, the reference probability densities are derived from training observation vectors. It will be appreciated that a reference probability density may represent an elementary cluster of training observation vectors as well as only one training observation vector. Even if only one training observation vector is involved, this is still referred to as an elementary cluster.

The N cells are hierarchically organized into a B-nary tree structure with L levels. B indicates the maximum number of branches at each node. Advantageously, a fully balanced tree is used, where $N=B^L$. In practice, during training some clusters and associated reference probability densities may become obsolete. As a consequence, some leaves or even branches of the tree may be removed from the tree. At the top level L, the root node represents the entire set of cells. These cells are divided into B subsets (also referred to as clusters), each comprising N/B cells (or less if N is not a power of B). Each of the clusters is represented by an intermediate node (non-leaf node) at level L-1. In its turn, each of these clusters is again divided into B sub-clusters (or less if some branches have become obsolete), each of which is represented by an intermediate node at level L-2. This dividing into sub-clusters is repeated until at the lowest level (level one), each node represents one elementary cluster of training observation vectors. Associated with each elementary cluster is a reference probability density, which is derived from the cluster of training observation vectors. Using Gaussian densities, each reference probability density can be described by a mean vector $\bar{\mu}_i$ and covariance matrix $K_i$ (for clusters also the mixture weight $w_i$ is used). A cluster, which corresponds to a node at level two of the tree or higher, is associated with a cluster probability density. This cluster probability density represents all elementary clusters, which are hierarchically in branches below the node. As such, the cluster probability density can be derived from the reference probability densities associated with those elementary clusters. This mechanism is repeated for all higher levels.

Figure 4:
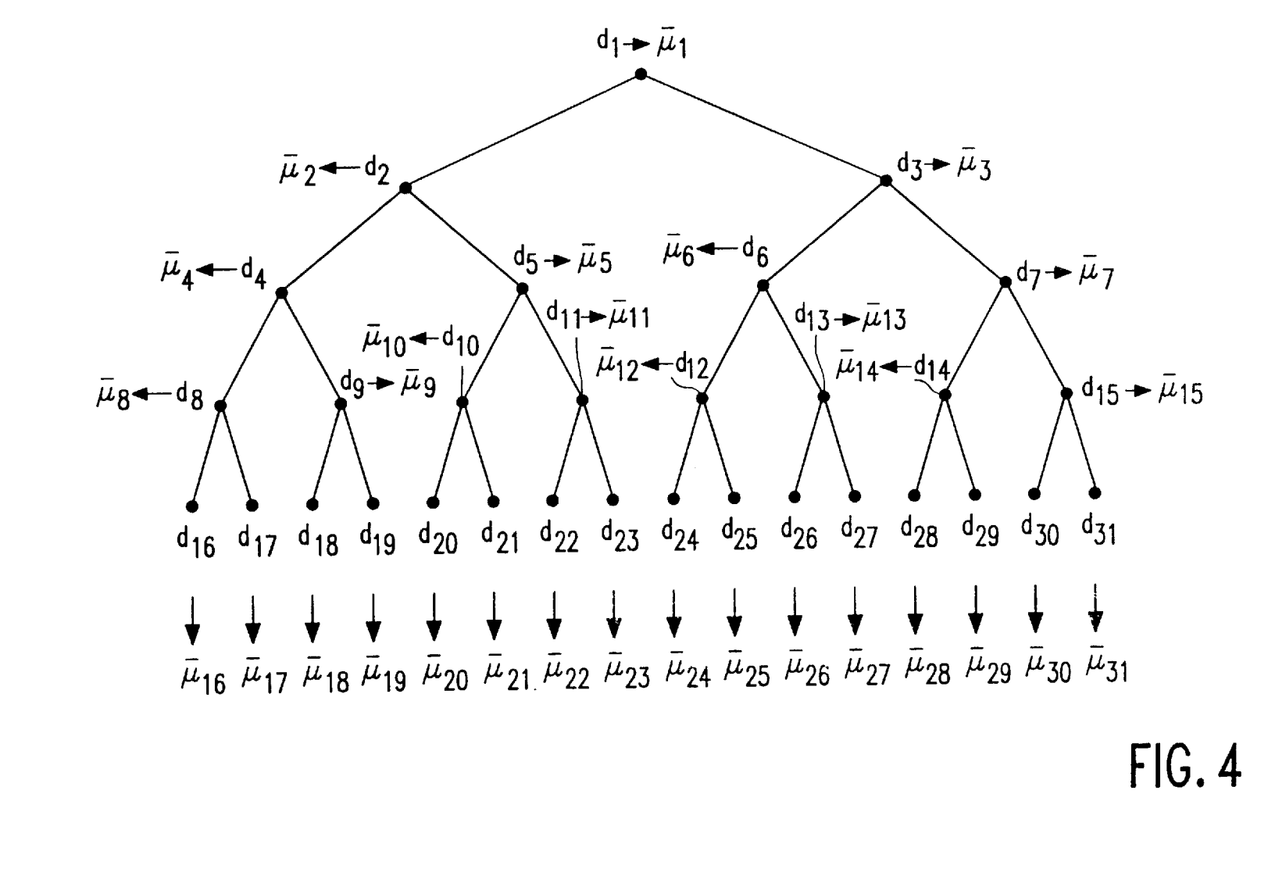
FIG. 4 illustrates tree-organized probability densities.

FIG. 4 illustrates a tree structure representing a mixture with 16 reference probability densities, represented by 16 mean vectors $\bar{\mu}_{16} \ldots \bar{\mu}_{31}$. The leaf nodes $d_{16} \ldots d_{31}$ of the tree, at level one, each correspond to one of the reference probability densities and the associated elementary cluster. The intermediate nodes $d_8 \ldots d_{15}$ at level 2 each represent a cluster with two sub-clusters. As an example, node $d_8$ is the parent node of nodes $d_{16}$ and $d_{17}$. As such, $d_8$ represents the cluster comprising training observation vectors of the two clusters which are represented by $d_{16}$ and $d_{17}$. The cluster probability density, which corresponds to $d_8$, is represented by the mean vector $\bar{\mu}_8$. This cluster probability density is derived from the two reference probability densities represented by $\bar{\mu}_{16}$ and $\bar{\mu}_{17}$. Similarly, $d_4$ represents the cluster comprising training observation vectors of the two clusters which are represented by $d_8$ and $d_9$, and, as such, $d_4$ represents the cluster comprising training observation vectors of the four clusters which are represented by $d_{16}$, $d_{17}$, $d_{18}$, and $d_{19}$. The cluster probability density, which corresponds to $d_4$ is represented by the mean vector $\bar{\mu}_4$. This cluster probability density is derived from the cluster probability densities $\bar{\mu}_8$ and $\bar{\mu}_9$, and, as such, from the reference probability densities represented by $\bar{\mu}_{16}, \bar{\mu}_{17}, \bar{\mu}_{18}$, and $\bar{\mu}_{19}$. It should be noted that the cluster probability densities, represented by $\bar{\mu}_1 \ldots \bar{\mu}_{15}$, are used to locate in the set of reference probability densities, represented by $\bar{\mu}_{16} \ldots \bar{\mu}_{31}$, a subset of reference probability densities, which give a high likelihood for the observation vector $\bar{o}$. For Gaussian densities, the mean vectors $\bar{\mu}_1 \ldots \bar{\mu}_{15}$ can be derived from the mean vectors $\bar{\mu}_{16} \ldots \bar{\mu}_{31}$ of the reference probability densities by calculating a weighted average in the following way:

$$\bar{\mu}_p = \frac{M_{2p}}{M_p} \bar{\mu}_{2p} + \frac{M_{2p+1}}{M_p} \bar{\mu}_{2p+1},$$

$$M_p = M_{2p} + M_{2p+1}$$

where $M_i$ is the number of reference vectors in the subset represented by node $d_i$. The corresponding covariance matrix $K_i$ for each probability density, represented by $\bar{\mu}_i$ is given by:

$$K_p = \frac{M_{2p}}{M_p} K_{2p} + \frac{M_{2p+1}}{M_p} K_{2p+1} +$$

$$\frac{M_{2p} M_{2p+1}}{M_p^2} (\bar{\mu}_{2p} - \bar{\mu}_{2p+1})(\bar{\mu}_{2p} - \bar{\mu}_{2p+1})^T$$

Building a tree

For each state, a mixture of probability densities is determined during the acoustic training. It is well known how an initial set of training data (training observation vectors or reference vectors) can be used to construct appropriate models (e.g., determine the sequence of reference units) and cluster the observation vectors for the pattern recognition. Each cluster is associated with a cluster probability density, represented by a mean vector and variance. It is also well known how the training can be used to improve an already trained system. Typically, the well-known k-means clustering method is used to cluster the training observation vectors, refer [L. Rabiner, "Fundamentals of speech recognition", Prentice Hall, section 3.4.4]. Advantageously, this clustering method is adapted to build the tree structure by remembering the clustering (for each cluster: which child clusters of one level lower it contains). In this way, during the training, a tree structure is built for each state. As an example, a binary tree structure can be built as follows:

1. Determine one density with a mean vector (centroid) $\bar{y}$ and variance for the entire set of training observation vectors. The mean vector $\bar{y}$ is the average of all training observation vectors.
2. Split the density into two densities, by determine two new centroids $\bar{y}^+$ and $\bar{y}^-$ (and variances) according to the rule: $\bar{y}^+ = \bar{y} + \bar{\epsilon}$, $\bar{y}^- = \bar{y} - \bar{\epsilon}$, where $\bar{\epsilon}$ is a splitting vector, typically with components in the order of 1.0.
3. For each training observation vector, determine which of the two densities is most likely for the training observation vector and assign the training observation vector to that density. In this way, two clusters are formed.
4. Recalculate the densities (centroid and variance) of the two clusters.
5. Iteration: repeat step 3 and 4 until a stop criterium is reached, such as no significant improvement is reached any more, or a predetermined number of iterations has been performed.
6. Iteration: repeat for each cluster step 2 to 5 one level lower in the tree, until the desired number of tree levels has been reached.

By ensuring that in step 6 the boundary, which was been determined between two clusters, is maintained at a level lower (so a vector which was assigned to a branch of a tree is not reassigned during the forming of sub-clusters one level lower), a binary tree is built. By leaving out levels of the tree, other tree structures with a branching factor of a power of two, such as a quaternary tree, can be built. It is obvious how trees with other branching factors can be built by changing the splitting of step 2 accordingly. The description of the clustering focuses on pooled covariance matrices. It is well-known how clustering can be performed using densities with other covariance matrices.

Tree search

The tree is searched, starting at the level below the root node (Level L- 1) until at least one reference probability density (and corresponding elementary cluster) at level 1 is located. For each non-leaf node at level L-1, the likelihood that the observation vector $\bar{o}$ is produced by the subset of reference probability densities, represented by the non-leaf node, is calculated by using the cluster probability density corresponding to the non-leaf node. As an example, the density may be given by formula (a), in which for the mean vector $\bar{\mu}_{s,k}$ the mean vector is taken which represents the cluster probability density. The branch for which a largest likelihood was obtained is selected to be searched further. Optionally, more than one branch may be selected according to a defined criterium. For the selected branches, the same process is repeated, one level lower in the tree. In this way, at level two of the tree at least one subset of reference probability densities is located. For the located subsets, the likelihood of the observation vector $\bar{o}$ is calculated for each reference probability density in the subsets. As described earlier, for the actual pattern recognition, the calculated likelihoods are kept and combined per reference pattern and also combined with the likelihoods calculated for subsequent observation vectors.

Figure 5:
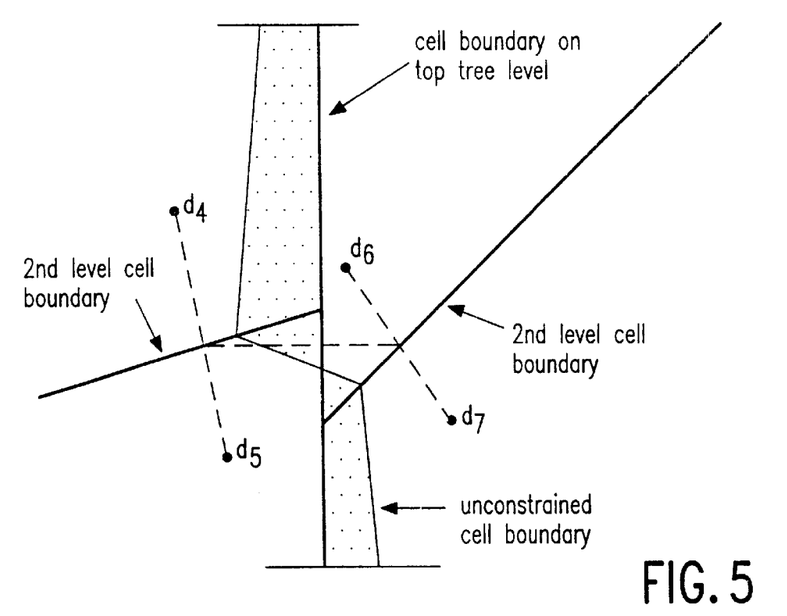
FIG. 5 illustrates two-dimensional cell boundaries for a binary tree with four leaves.

Since the top level of the tree is not used during searching, it will be appreciated that the tree comprises at least L=3 levels. Using this search strategy for a fully balanced tree, a total of $L=\log_B(N)$ levels need to be checked, requiring B likelihood calculations at each level of the tree. If at each level of the tree one branch is selected, this gives a total of $B \cdot \log_B(N)$ calculations, with some additional overhead for traversing the tree. This compares favorably to calculating the likelihood of all N cells. The drawback of the tree search is that it is not guaranteed that always the reference probability density is located which gives the highest likelihood for the observation vector (the average hit rate is less than 100%). This is illustrated in FIG. 5, which gives a two-dimensional example of cell boundaries for a binary tree with four leaves ($d_4$ to $d_7$). FIG. 5 shows the cell boundaries which were achieved as a result of clustering at the top level (level 3) and at level two. The clustering gave four cells separated by cell boundaries indicated by a thick line. The optimal division into cells is shown by the thin boundary lines, which deviates partly from the top level boundary (the assignment at the second level of the tree is accurate). The dotted area shows the mis-assigned area.

This method has been tested in the Philips automatic timetable information system AIS. This speaker-independent recognition system uses forty Hidden Markov Models, each modeling a context independent phoneme, using six states. Continuous mixture densities are used. The recognition lexicon comprises 1850 entries. Training and test corpora consist of german real-life train schedule enquiries (spontaneous utterances recorded over the telephone network). The system was trained on 8793 utterances, representing 7.3 hours of speech (of which 47% was labeled as silence). The test corpus consists of 2278 utterances (1.5 hours of speech) making up a total of 7078 spoken words, of which 224 are out of vocabulary. The following table shows the results which have been achieved using trees with 64 leaves (6 splits). A total of 40 Hidden Markov Models were used to model 40 sub-word units. Each model had six states. For the six states, three different mixtures were used: two successive states shared the same mixture (state 1 and 2, 3 and 4, and 5 and 6). Each mixture comprised 2 densities. Additionally, a special model with only one state was used to model silence. This gives in principle (40*3+1)*64=7744 densities. Since during training some densities were identified as being obsolete and were purged from the tree, in practice a total of approximately 7600 densities were used. The table shows the result achieved for various branching factors ranging from B=2, giving a binary tree, to B=64 giving a flat tree, which effectively is a full search. At each level in the tree, only one branch was selected.

| B | $N_{eff}$ | Hit rate | Word error rate | Relative loss |
|---|---|---|---|---|
| 2 | 11.9 | 70% | 26.3% | 7.3% |
| 4 | 11.9 | 76% | 26.0% | 6.1% |
| 8 | 15.9 | 82% | 25.0% | 2.0% |
| 16 | 20.0 | 80% | 25.2% | 2.9% |
| 64 | 63.3 | 100% | 24.5% | — |

In the table, $N_{eff}$ indicates the number of distances which were in average computed for each state of the model. It should be noted that due to the purging of some reference vectors during the training, $N_{eff}$ is in average slightly below the numbers for a full tree, being 12, 12, 16, 20 and 64 respectively. The hit rate indicates the percentage of time that the full search and the tree search locate the same reference vector as being nearest to the observation vector. The Word Error-Rate (WER) indicates the percentage of time that the spoken word is not correctly recognized. This includes substitutions (a word was wrongly identified as another word), insertions (a 'long' word was wrongly identified as a sequence of shorter words) and deletions (a sequence of 'short' words was wrongly identified as a long word).

For the various types of trees, the following computational effort is required:

| B | Number of calculations |
|---|---|
| 2 | 12 (6 levels, each requiring 2 calculations) |
| 4 | 12 (3 levels, each requiring 4 calculations) |
| 8 | 16 (2 levels, each requiring 8 calculations) |
| 16 | 20 (2 levels, one of 16 calculations and one of 4 calculations) |
| 64 | 64 (1 level, requiring 64 calculations) |

As a consequence, the computational effort required for a binary tree is the same as for a quaternary tree. The previous table already illustrated that a quaternary tree gave better results than a binary tree (a quaternary tree has less branching levels and results in calculating more distances in full, giving a more accurate result). It is, therefore, advantageous to use a quaternary tree structure. It will be appreciated that for the same reason using a tree structure with more branches, such as B=8 or B=16, gives even better results. However, due to the increase in computational effort, it is advantageous to use a quaternary tree with more nodes as an alternative to using more branches. This is illustrated in the following table:

| | Full search | | | Quaternary tree search | | | | |
|---|---|---|---|---|---|---|---|---|
| #leaves | #Densities | $N_{eff}$ | WER | #Densities | $N_{eff}$ | Hit Rate | WER | Relative loss |
| 16 | 1936 | 16.0 | 26.7% | 1929 | 7.6 | 88% | 27.8% | 4.1% |
| 32 | 3862 | 31.9 | 24.9% | 3838 | 10.0 | 78% | 26.5% | 6.4% |
| 64 | 7655 | 63.3 | 24.5% | 7543 | 11.9 | 76% | 26.0% | 6.1% |
| 128 | 15049 | 124.8 | 24.4% | 14539 | 13.9 | 67% | 25.5% | 4.5% |
| 256 | 28998 | 242 | 24.3% | 26861 | 15.6 | 65% | 24.8% | 2.1% |

This table shows that by using more densities, a better result (lower word error rate) is obtained. By comparing the result for 128 and 256 nodes using the quaternary tree (B=4) to the results obtained using a tree with B=8 and 64 nodes (previous table), it is clear that for less or similar computational effort the quaternary tree, using more densities, gives better results.

The table also indicates that the increase in number of densities results in a lower hit rate. The hit rate can be improved by selecting at some or all of the levels of the tree more than just one branch. One way of doing this is, for instance, selecting in a quaternary tree two branches at each level. For a quaternary tree with 64 leaves, this would require 28 computations, compared to 12 computations if only one branch is selected at every level. It will be appreciated that if at a certain level in the tree one of the four possible branches gives a much higher likelihood for the observation vector than the other three branches, that it is highly likely that the reference probability density which gives the highest likelihood is a member of that branch. On the other hand, if a group of more than one branch gives a similar, relatively high likelihood for the observation vector, then selecting only one branch leads more likely to a wrong decision.

Therefore, in a further embodiment a threshold T is used. At each level of the tree, the node with the cluster probability density, which gives the highest likelihood, is selected. If the difference in log-likelihood of the best node and the second best node is below the threshold T, then also the second best node is selected and both branches are searched further. This method has been tested for various values of T, as indicated in the following table:

| #Leaves | Threshold T | $N_{eff}$ | Hit rate | WER | Relative loss |
| --- | --- | --- | --- | --- | --- |
| 64 | full search | 63.3 | 100% | 24.5% | — |
| 64 | 0 | 11.9 | 76% | 26.0% | 6.1% |
| 64 | 2 | 14.2 | 87% | 25.8% | 5.3% |
| 64 | 4 | 16.3 | 93% | 25.7% | 4.9% |
| 64 | 6 | 18.4 | 95% | 25.3% | 3.2% |
| 256 | full search | 242 | 100% | 24.3% | |
| 256 | 0 | 15.7 | 65% | 24.8% | 2.1% |
| 256 | 2 | 20.7 | 82% | 24.4% | 0.4% |
| 256 | 4 | 26.2 | 89% | 24.2% | −0.4% |
| 256 | 6 | 31.6 | 92% | 24.3% | 0.0% |

The table shows results for a tree with 64 leaves and a tree with 256 leaves. For each tree, the first row shows the result using a full search (no threshold is used). The row with T=0 gives the results if only one branch is selected at every level. For the higher thresholds, the likelihood that at a certain level two branches are selected increases, as reflected by the number of distances which were actually computed for each state of the model ($N_{eff}$). Particularly, for large trees, such as 256 leaves, significant increases in performance can be achieved without noticeable loss in accuracy. Persons skilled in the art will be able to select for their system the most appropriate s threshold. It will be appreciated that the threshold mechanism can also be used to allow the selection of more than two branches, if this would be required.

At the intermediate levels, the cluster likelihood of the observation is actually not used for the real likelihood calculation, which is only performed for the reference probability densities represented by the leaf nodes. At the intermediate levels, it is only required to know which cluster probability density gives the highest likelihood for the observation vector, not what the actual likelihood is.

For Gaussian densities, which use the Euclidian norm ($L_2$-norm), it is possible to determine which cluster probability density gives the highest likelihood by using a simpler calculation, requiring mainly a vector scalar product calculation (also referred to as inner product or dot product). By using Gaussian densities with only a single scalar variance per Gaussian density:

$$K_{s,k} = I \cdot \sigma_{s,k}^2$$

formula (a) becomes:

$$-\log(p(\bar{o})) \approx \min\left\{ \log\frac{1}{w_k} + \frac{D}{2}\log 2\pi + \frac{D}{2}\log \sigma_{s,k}^2 + \frac{\|\bar{o}-\bar{\mu}_{s,k}\|_2^2}{2\sigma_{s,k}^2} \mid k=1,\ldots,N \right\}$$

By defining:

$$f(\bar{o}, \bar{\mu}_{s,k}) = \log\frac{1}{w_k} + \frac{D}{2}\log 2\pi + \frac{D}{2}\log \sigma_{s,k}^2 + \frac{\|\bar{o}-\bar{\mu}_{s,k}\|_2^2}{2\sigma_{s,k}^2},$$

$$g_{ij}(\bar{o}) = f(\bar{o}, \bar{\mu}_{s,i}) - f(\bar{o}, \bar{\mu}_{s,j})$$

the discriminating function $g_{ij}(\bar{o})$ indicates which of cluster probability densities (represented by the mean vectors $\bar{\mu}_i$ or $\bar{\mu}_j$) gives the highest likelihood for $\bar{o}$. Only the sign of $g_{ij}(\bar{o})$ is relevant: if $g_{ij}(\bar{o})$ is positive, the cluster probability density represented by $\bar{\mu}_j$ gives the highest likelihood for $\bar{o}$; if $g_{ij}(\bar{o})$ is negative, the cluster probability density represented by $\bar{\mu}_i$ gives the highest likelihood for $\bar{o}$. Using the following principle:

$$\|\bar{o}-\bar{\mu}_i\|_2^2 = \|\bar{o}\|_2^2 - 2\bar{o}^T\bar{\mu}_i + \|\bar{\mu}_i\|_2^2$$

gives for $g_{ij}(\bar{o})$:

$$g_{ij}(\bar{o}) = \log\frac{w_j}{w_i} + \frac{D}{2}\log 2\pi \frac{\sigma_{s,i}^2}{\sigma_{s,j}^2} + \frac{\|\bar{\mu}_{s,i}\|^2}{2\sigma_{s,i}^2} - \frac{\|\bar{\mu}_{s,j}\|^2}{2\sigma_{s,j}^2} + \left(\frac{1}{2\sigma_{s,i}^2} - \frac{1}{2\sigma_{s,j}^2}\right)\|\bar{o}\|_2^2 - \bar{o}^T\left(\frac{\bar{\mu}_{s,i}}{\sigma_{s,j}^2} - \frac{\bar{\mu}_{s,j}}{\sigma_{s,j}^2}\right)$$

In this formula, the first four terms can be calculated once, for instance during training. Of the fifth term, the first factor can also be calculated once. The second factor (the squared norm of $\bar{o}$) only needs to be calculated once for each observation vector and can be used for all reference vectors. Only the last term, which is a vector scalar product, needs to be calculated for each observation vector and each reference vector. Using this formula, $g_{ij}(\bar{o})$ is first used to determine whether cluster probability density 1 gives a higher likelihood for $\bar{o}$ than the cluster probability 2. Next, the cluster probability density which gave the highest likelihood is compared to the cluster probability density 3. This is repeated until all cluster probability densities at this level of the tree have been tested. The sequence in which the cluster probability densities are selected for calculation is not important.

A similar technique can be applied if the covariance matrix for the Gaussian densities is tied among all densities of a mixture: the covariance matrix $K_{s,k}=K_s$, where s is the state of the Hidden Markov Model and k indicates a density for that state. This results in the boundaries between the clusters represented by different branches of the tree being hyperplanes. Formula (a) becomes:

$$-\log(p(\overline{o})) \approx \min \left\{ \log \frac{1}{w_k} + \frac{D}{2} \log 2\pi + \frac{1}{2} \log det K_s + \frac{1}{2} (\overline{o} - \overline{\mu}_{s,k})^T K_s^{-1} (\overline{o} - \overline{\mu}_{s,k}) | k = 1, \ldots, N \right\}$$

By defining:

$$f(\overline{o}, \overline{\mu}_{s,k}) = \log \frac{1}{w_k} + \frac{D}{2} \log 2\pi + \frac{1}{2} \log det K_s + \frac{1}{2} (\overline{o} - \overline{\mu}_{s,k})^T K_s^{-1} (\overline{o} - \overline{\mu}_{s,k})$$

the discriminating function $g_{ij}(\overline{o})$:

$$g_{ij}(\overline{o}) = f(\overline{o}, \overline{\mu}_{s,i}) - f(\overline{o}, \overline{\mu}_{s,j})$$

becomes:

$$g_{ij}(\overline{o}) = \log \frac{w_j}{w_i} + \frac{1}{2} (\overline{o} - \overline{\mu}_{s,i})^T K_s^{-1} (\overline{o} - \overline{\mu}_{s,j}) - \frac{1}{2} (\overline{o} - \overline{\mu}_{s,j})^T K_s^{-1} (\overline{o} - \overline{\mu}_{s,j})$$

$$= \log \frac{w_j}{w_i} + \frac{1}{2} [(\overline{\mu}_{s,j} - \overline{\mu}_{s,i})^T K_s^{-1} \overline{o} + \overline{o}^T K_s^{-1} (\overline{\mu}_{s,j} - \overline{\mu}_{s,i}) + \overline{\mu}_{s,i} K^{-1} \overline{\mu}_{s,i} - \overline{\mu}_{s,j} K^{-1} \overline{\mu}_{s,j}]$$

Since in general:

$$a^T M b = (a^T M b)^T = b^T M^T a$$

and $K^{-1}$ is a symmetrical matrix, this gives:

$$g_{ij}(\overline{o}) = \log \frac{w_j}{w_i} + \overline{o}^T K_s^{-1} (\overline{\mu}_{s,j} - \overline{\mu}_{s,i}) + \frac{1}{2} \overline{\mu}_{s,i} K^{-1} \overline{\mu}_{s,i} - \frac{1}{2} \overline{\mu}_{s,j} K^{-1} \overline{\mu}_{s,j}$$

In this formula, terms 1, 3 and 4 can be calculated once, for instance during training. Of the second term, the vector $K^{-1} (\overline{\mu}_{s,j} - \overline{\mu}_{s,i})$ can also be calculated in advance, implying that only the vector scalar product of this vector with $\overline{o}$ remains to be calculated on-line.

Tree search during training

Figure 6:
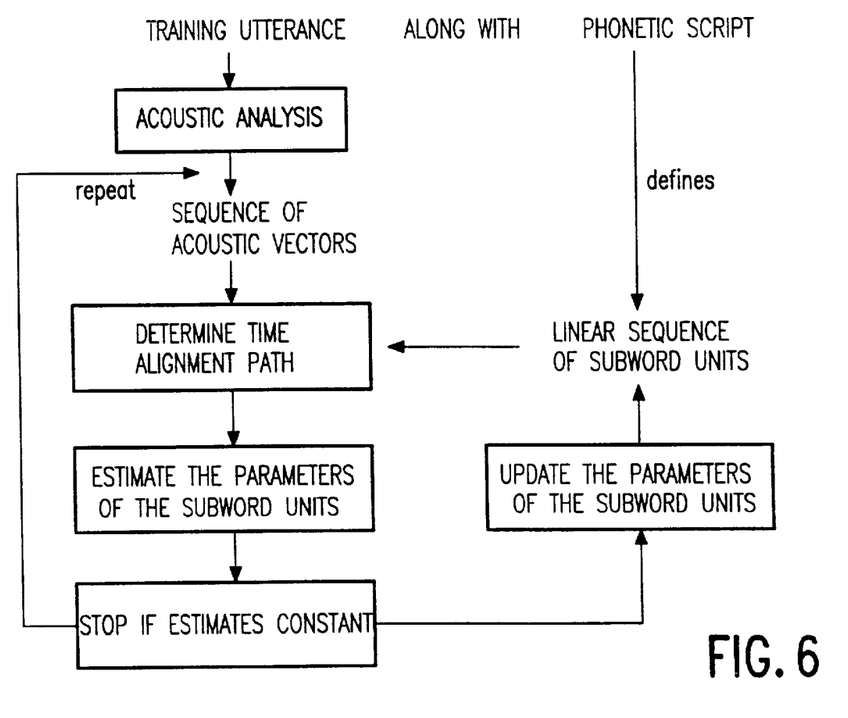
FIG. 6 shows a flow-diagram for the iterative training process.

During training, the unknown parameters of the Hidden Markov Models are estimated. This involves estimating the unknown sequence of reference units (states) and the unknown model parameters (mixture density parameters). FIG. 6 illustrates a typical training process. The same step of acoustic analysis as used for speech recognition is used to transform a training utterance into a time sequence of training observation vectors. In an iterative process, the time alignment of the training observation vectors to the states and the model parameters are improved. At each loop of the iteration the model, which has been constructed at that moment, is used to time align the training observation vectors. It is well known how this can be done, for instance by using the Viterbi algorithm. The Viterbi algorithm determines the best state sequence for a given sequence of observation vectors. As a result of the time alignment, each training observation vectors is assigned to a state and its mixture density. Next, the observation vectors for each mixture density are collected (clustered) and used to re-estimate the parameters of the density. The described k-means clustering method can be used for this. As is clear, due to the time alignment, some observation vectors will be assigned to another state and mixture density. Since at the same time a certain level of the tree is being constructed (as part of the clustering), the reassignment affects the already performed clustering and building of the tree. Instead of restarting the clustering from scratch at the top level of the tree, advantageously, the described tree search algorithm is used to preliminary assign the training observation vectors to a cluster. This can be integrated into the clustering procedure as one more level of iteration. As an example, a binary tree structure can be built as follows (note that the following procedure is performed in parallel for each state):

1. Determine one mixture density with a mean vector (centroid) $\overline{y}$ and variance for the entire set of training observation vectors for the state. The mean vector $\overline{y}$ is the average of all training observation vectors.
2. Time align the system, by determining for each training observation vector the most appropriate state.
3. Recalculate the mixture density.
4. Iteration: repeat step 2 and 3 until a stop criterium is reached, such as no significant improvement is reached any more, or a predetermined number of iterations has been performed.
5. Split the mixture density into two mixture densities (one level lower), by determining two new centroids $\overline{y}^+$ and $\overline{y}^-$ according to the rule: $\overline{y}^+ = \overline{y} + \overline{\epsilon}$, $\overline{y}^- = \overline{y} - \overline{\epsilon}$, where $\overline{\epsilon}$ is a splitting vector, typically with components in the order of 1.0. (The variances of the new two densities are, for now, copied from the original density).
6. For each training observation vector, determine which of the two mixture densities is most likely for the observation vector and assign the observation vector to that density. In this way two clusters are formed.
7. Recalculate the mixtures (centroid and variance) of the two clusters.
8. Iteration: repeat step 6 and 7 until a stop criterium is reached, such as no significant improvement is reached any more, or a predetermined number of iterations has been performed.
9. Time align the system, by determining for each training observation vector the most appropriate state.
10. Use the tree search algorithm to assign each training observation vector to a cluster at the tree level which is currently being built.
11. Recalculate all mixture densities starting at the current tree level, going upwards.
12. Iteration: repeat step 10 and 11 until a stop criterium is reached, such as no significant improvement is reached any more, or a predetermined number of iterations has been performed.
13. Iteration: repeat starting at step 9 until a stop criterium is reached, such as no significant improvement is reached any more, or a predetermined number of iterations has been performed.
14. Iteration: repeat starting at step 5 for each mixture density at the currently lowest level (which has become stable now) until the desired number of tree levels has been reached.

As a starting point for the iterations of FIG. 6, each of these training sentences (sequence of observations) may be manually segmented into states or, alternatively, automatically segmented into states, either linearly or using an older model, if available.

Using the tree search during training results in a significant reduction in the time required to train the system. In the AIS system operating at maximum resolution of 29000 densities, the training time was reduced from 108 hours to 25 hours. It should be noted that this leads to a degradation in recognition. The following table shows that for a low resolution system (16 leaves per tree, a total of 1900 densities), which is more affected than a high resolution system, the relative loss is approximately 2%.

| tree used for | | | | | Relative |
|---|---|---|---|---|---|
| training | testing | $N_{eff}$ | Hit rate | WER | loss |
| no | no | 16.0 | 100% | 26.7% | — |
| yes | yes | 7.6 | 88% | 27.8% | 4.1% |
| yes | no | 15.9 | 100% | 27.2% | 1.9% |

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for recognising an input pattern which is derived from a continual physical quantity, said method comprising the steps of:

accessing said physical quantity and therefrom generating a sequence of input observation vectors, representing said input pattern;

locating among a plurality of reference patterns a recognised reference pattern, which corresponds to said input pattern; at least one reference pattern being a sequence of reference units; each reference unit being represented by at least one associated reference probability density in a set of reference probability densities;

representing a selection of the reference probability densities as a tree structure, where each leaf node corresponds to a reference probability density, and where each non-leaf node corresponds to a cluster probability density, which is derived from reference probability densities corresponding to leaf nodes in branches of said non-leaf node;

said locating comprising for each input observation vector $\bar{o}$:

selecting a plurality of leaf nodes by searching said tree structure via non-leaf nodes for which the corresponding cluster probability density gives an optimum cluster likelihood for said input observation vector $\bar{o}$; and calculating an observation likelihood of said input observation vector $\bar{o}$ for each reference probability density which corresponds to a selected leaf node, said method comprising representing the reference probability densities associated with each reference unit as a separate tree structure, and said locating comprising selecting leaf nodes of each separate tree structure by performing said searching for each separate tree structure.

2. A method as claimed in claim 1, wherein searching said tree structure via non-leaf nodes includes searching at at least one level of said tree structure a path via one non-leaf node for which an optimum of said cluster likelihood is calculated, supplemented by paths via non-leaf nodes for which said cluster likelihood is within a predetermined range of said optimum cluster likelihood.

3. A method as claimed in claim 1, wherein said tree structure is a quaternary tree, in which each non-leaf node is hierarchically one level above a maximum of four nodes and at least one non-leaf node is hierarchically one level above four nodes.

4. A method as claimed in claim 1, wherein searching said tree structure via said non-leaf nodes comprises, for a group of non-leaf nodes within a same branch of said tree structure and at a same level of said tree structure:

calculating for a selected pair of said non-leaf nodes a cluster comparison score between the two corresponding cluster probability densities and said input observation vector $\bar{o}$; said cluster comparison score indicating which of the two corresponding cluster probability densities gives the highest likelihood for the input observation vector $\bar{o}$;

repeating calculating said cluster comparison score for the non-leaf node, for which the previously calculated cluster comparison score indicated the highest likelihood, and another non-leaf node of said group for which no cluster comparison score has been calculated yet, until a cluster comparison score has been calculated for all non-leaf nodes of said group; and including in said searching, a path via the non-leaf node for which the cluster comparison score indicated the highest likelihood.

5. A method as claimed in claim 1, wherein:

the probability densities are derived from a sequence of training observation vectors, representing known input patterns;

said representing said set of reference probability densities as a tree structure comprises:

clustering said training observation vectors into a hierarchical set of clusters and calculating for each cluster a cluster probability density segmenting said sequence of training observation vectors into a sequence of corresponding reference patterns and corresponding reference units; and iteratively:

clustering for each reference unit the corresponding training observation vectors into a hierarchical set of clusters, forming separate tree structures, each of which corresponds to a separate reference unit; and time aligning said sequence of training observation vectors according to said sequence of reference units by:

determining for each training observation vector a corresponding reference unit, which according to a predetermined optimality criterion is most likely, and assigning each training observation vector to one of said clusters by searching the tree structure of the corresponding reference unit for the cluster with an optimum cluster likelihood.

6. A system for recognising a time-sequential input pattern, which is derived from a continual physical quantity, said system comprising:

input means for accessing said physical quantity and therefrom generating a sequence of input observation vectors, representing said input pattern;

a tree builder for representing a selection of reference probability densities from a set of reference probabilities as a tree structure, where each leaf node corresponds to a reference probability density, and where each non-leaf node corresponds to a cluster probability density, which is derived from all reference probability densities corresponding to leaf nodes in branches below said non-leaf node;

a reference pattern database for storing a plurality of reference patterns, at least one reference pattern being a sequence of reference units; each reference unit being represented by at least one associated reference probability density in said set of reference probability densities, said selection of reference probability densities being stored as said tree structure;

a localizer for locating among the reference patterns stored in said reference pattern database a recognised reference pattern, which corresponds to said input pattern, said locating comprising for each input observation vector $\bar{o}$:

selecting a plurality of leaf nodes by searching said tree structure via non-leaf nodes for which the corresponding cluster probability density gives an optimum cluster likelihood for said input observation vector $\bar{o}$, and calculating an observation likelihood of said input observation vector $\bar{o}$ for each reference probability density which corresponds to a selected leaf node; and output means for outputting said recognised pattern; wherein:

said tree builder is conceived to for each reference unit represent the associated reference probability densities as a separate tree structure, said reference pattern database further stores for each reference unit said separate tree structure, and said locating comprises selecting leaf nodes of each separate tree structure by performing said searching for each separate tree structure.

7. A system as claimed in claim 6, wherein searching said tree structure via non-leaf nodes includes searching at at least one level of said tree structure a path via one non-leaf node for which an optimum of said cluster likelihood is calculated, supplemented by paths via non-leaf nodes for which said cluster likelihood is within a predetermined range of said optimum cluster likelihood.

8. A system as claimed in claim 6, wherein said tree structure is a quaternary tree, in which each non-leaf node is hierarchically one level above a maximum of four nodes and at least one non-leaf node is hierarchically one level above four nodes.

9. A system as claimed in claim 6, wherein searching said tree structure via said non-leaf nodes comprises for a group of non-leaf nodes within a same branch of said tree structure and at a same level of said tree structure:

calculating for a selected pair of said non-leaf nodes a cluster comparison score between the two corresponding cluster probability densities and said input observation vector $\bar{o}$; said cluster comparison score indicating which of the two corresponding cluster probability densities gives the highest likelihood for the input observation vector $\bar{o}$;

repeating calculating said cluster comparison score for the non-leaf node, for which the previously calculated cluster comparison score indicated the highest likelihood, and another non-leaf node of said group for which no cluster comparison score has been calculated yet, until a cluster comparison score has been calculated for all non-leaf nodes of said group; and including in said searching a path via the non-leaf node for which the cluster comparison score indicated the highest likelihood.

10. A system as claimed in claim 6, wherein:

the probability densities are derived from a sequence of training observation vectors, representing known input patterns;

said representing said set of reference probability densities as a tree structure comprises:

clustering said training observation vectors into a hierarchical set of clusters and calculating for each cluster a cluster probability density segmenting said sequence of training observation vectors into a sequence of corresponding reference patterns and corresponding reference units; and iteratively:

clustering for each reference unit the corresponding training observation vectors into a hierarchical set of clusters, forming separate tree structures, each of which corresponds to a separate reference unit; and time aligning said sequence of training observation vectors according to said sequence of reference units by:

determining for each training observation vector a corresponding reference unit, which according to a predetermined optimality criterion is most likely, and assigning each training observation vector to one of said clusters by searching the tree structure of the corresponding reference unit for the cluster with an optimum cluster likelihood.

* * * * *